United States Patent
Wen et al.

(10) Patent No.: US 7,287,025 B2
(45) Date of Patent: Oct. 23, 2007

(54) SYSTEMS AND METHODS FOR QUERY EXPANSION

(75) Inventors: Ji-Rong Wen, Beijing (CN); Hang Cui, Singapore (SG); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 10/365,294

(22) Filed: Feb. 12, 2003

(65) Prior Publication Data

US 2004/0158560 A1 Aug. 12, 2004

(51) Int. Cl.
G06F 17/30 (2006.01)
(52) U.S. Cl. ............... 707/5; 707/2; 707/3; 707/4; 707/100
(58) Field of Classification Search .......... 707/1–10, 707/104.1, 200–205; 704/257, 9; 713/300
See application file for complete search history.

(56) References Cited

U.S. PATENT DOCUMENTS

| | | | |
|---|---|---|---|
| 5,787,422 A | 7/1998 | Tukey et al. | |
| 5,864,845 A | 1/1999 | Voorhees et al. | |
| 6,128,613 A * | 10/2000 | Wong et al. | 707/7 |
| 6,169,986 B1 * | 1/2001 | Bowman et al. | 707/5 |
| 6,701,309 B1 * | 3/2004 | Beeferman et al. | 707/3 |
| 6,772,150 B1 * | 8/2004 | Whitman et al. | 707/6 |
| 6,856,957 B1 * | 2/2005 | Dumoulin | 704/257 |
| 6,886,010 B2 * | 4/2005 | Kostoff | 707/3 |
| 6,925,433 B2 * | 8/2005 | Stensmo | 704/9 |
| 2002/0099701 A1 * | 7/2002 | Rippich | 707/5 |
| 2002/0133726 A1 * | 9/2002 | Kawamae et al. | 713/300 |
| 2003/0004968 A1 * | 1/2003 | Romer et al. | 707/104.1 |
| 2004/0220925 A1 * | 11/2004 | Liu et al. | 707/3 |
| 2004/0243568 A1 * | 12/2004 | Wang et al. | 707/3 |

OTHER PUBLICATIONS

Automatic Feedback Using Past Queries: Social Searching?, Author: Larry Fitzpatrick et al Published: Jul. 1997.*
Wong, S.K.M. and Yao, Y.Y.; "A Probabilistic Method for Computing Term-by-term Relationships" Department of Computer Science, University of Regina, Regina, Saskatchewan, Canada; 24 pages.
Cui, Hang et al.; "Probabilistic Query Expansion Using Query Logs" Microsoft Research Asia, Beijing, Tianjin University, Tianjin, P.R. China, May 2002, 8 pages.
Xu, Jinxi and Croft, W. Bruce; "Improving the Effectiveness of Information Retrieval with Local Context Analysis" ACM Transactions on Information Systems, vol. 18, No. 1, Jan. 2000, pp. 79-112.
Buckley, Chris et al.; "Automatic Query Expansion Using SMART : TREC 3" Department of Computer Science, Cornell University, Ithaca, NY; 1998, 11 pages.

(Continued)

*Primary Examiner*—Khanh B. Pham
(74) *Attorney, Agent, or Firm*—Lee & Hayes, PLLC

(57) ABSTRACT

Systems and methods for query expansion are described. In one aspect, new terms are extracted from a newly submitted query. Terms to expand the new terms are identified to a relevant document list. The expansion term are identified at least in part on the new terms and probabilistic correlations from information in a query log. The query log information includes one or more query terms and a corresponding set of document identifiers (IDs). The query terms were previously submitted to a search engine. The document IDs represent each document selected from a list generated by the search engine in response to searching for information relevant to corresponding ones of the query terms.

13 Claims, 5 Drawing Sheets

OTHER PUBLICATIONS

Attar, R. and Fraenkel, A.S.; "Local Feedback in Full-Text Retrieval Systems" Journal of the Association for Computing Machinery, vol. 24, No. 3, Jul. 1977, pp. 397-417.

S.K.M. Wong et al., "A Probabilistic Method for Computing Term-by-term Relationships," Journal of the American Society for Information Science, 44(8), 1993, pp. 431-439.

Hang Cui et al., "Probabilistic Query Expansion Using Query Logs," WWW 2002, May 7-11, 2002, Honolulu, Hawaii, USA (8 pages).

Jinxi Xu et al., "Improving the Effectiveness of Information Retrieval with Local Context Analysis," ACM Transactions on Information Systems, vol. 18, No. 1, Jan. 2000, pp. 79-112.

Chris Buckley et al., "Automatic Query Expansion Using SMART : Trec 3," Department of Computer Science, Cornell University, Ithaca, NY, 1995, (11 pages).

R. Attar et al., "Local Feedback in Full-Text Retrieval Systems," Journal of the Association for Computing Machinery, vol. 24, No. 3, Jul. 1977, 397-417.

* cited by examiner

SYSTEMS AND METHODS FOR QUERY EXPANSION

BACKGROUND

People increasingly rely on the World Wide Web ("Web") to satisfy diverse information needs. To meet these needs, existing search engine technology allows users to input a query consisting of one or more keywords for a search for Web documents containing the keywords. Users typically select such keywords because they are thought to be related to the information being sought. Often, however, selected keywords are not always good descriptors of relevant document contents.

One reason for this is that most words in natural language have inherent ambiguity. Such ambiguity often results in search engine keyword/document term mismatch problems. Very short queries amplify such mismatch problems. Additionally, vocabularies used by Web content authors can vary greatly. In light of this, generating a search engine query that will result in return of a document list of relevance to a user is a difficult problem. In efforts to address this problem, search engine services typically expand queries (i.e., add terms/keywords). Unfortunately, existing query expansion techniques are considerably limited for numerous reasons.

One limitation, for example, is that global analysis query expansion techniques do not typically address term mismatch. Global analysis techniques are based on the analysis of a corpus of data to generate statistical similarity matrixes of term pair co-occurrences. Such corpus-wide analysis is typically resource intensive, requiring substantial computer processing, memory, and data storage resources. The similarity matrixes are used to expand a query with additional terms that are most similar to the terms already in the query. By only adding "similar" terms to the query, and by not addressing the ambiguities that are inherent between words in language, this global analysis approach to query expansion does not address term mismatch, which is one of the most significant problems in query expansion.

In another example, some query expansion techniques require explicit relevance information from the user, which can only be obtained by interrupting the task that the user is currently performing. To obtain this information, after submitting a query to a search engine and receiving a list of documents, rather that browsing the documents in the document list or submitting a new query, the user is asked to manually rank the relevance of the documents in the list. This may be accomplished by check-box selection, enumeration, or otherwise indicating that particular ones of the documents in the list are more relevant that others.

If the user volunteers and manually ranks the documents in the list, subsequent queries submitted to the search engine are then expanded with term(s) extracted from the documents that the user specifically marked as being relevant. Unfortunately, users are often reluctant to interrupt their immediate activities to provide such explicit relevance feedback. Thus, the search engine has no idea whether or not the user considered one document to be more relevant than another. This means that the search engine has no indication of any term that can be considered more relevant than another to a particular query. For this reason, explicit relevance feedback techniques are seldom used to expand queries.

In another example, some query expansion techniques automatically assume that the top-ranked document(s) that are returned to the user in response to a query are relevant. The original queries from the user are then expanded with term(s) extracted from such top-ranked document(s). This technique becomes substantially problematic when a large fraction of the top-ranked documents are actually not relevant to the user's information need. In this situation, words drawn from such documents and added to the query are often unrelated to the information being sought and the quality of the documents retrieved using such an expanded query is typically poor.

In another example, some query expansion techniques extract noun groups or "concepts" from a set of top-ranked documents. These noun groups are extracted based on co-occurrences with query terms and not based on the frequencies that the term(s) appear in the top-ranked documents. This technique is based on the hypothesis that a common term from the top-ranked documents will tend to co-occur with all query terms within the top-ranked documents. This hypothesis is not always true and often leads to improper query expansion. In other words, this technique is conducted in the document space only, without considering any judgments from users. It requires distinctive difference between the cluster of relevant documents and that of non-relevant documents in the retrieval result. This is true for many cases but does not hold some time, especially for those inherently ambiguous queries.

In light of the above, further innovation to select relevant terms for query expansion is greatly desired.

SUMMARY

Systems and methods for query expansion are described. In one aspect, new terms are extracted from a newly submitted query. Terms to expand the new terms are identified to a relevant document list. The expansion term are identified at least in part on the new terms and probabilistic correlations from information in a query log. The query log information includes one or more query terms and a corresponding set of document identifiers (IDs). The query terms were previously submitted to a search engine. The document IDs represent each document selected from a list generated by the search engine in response to searching for information relevant to corresponding ones of the query terms.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

An Exemplary Operating Environment

Figure 1:
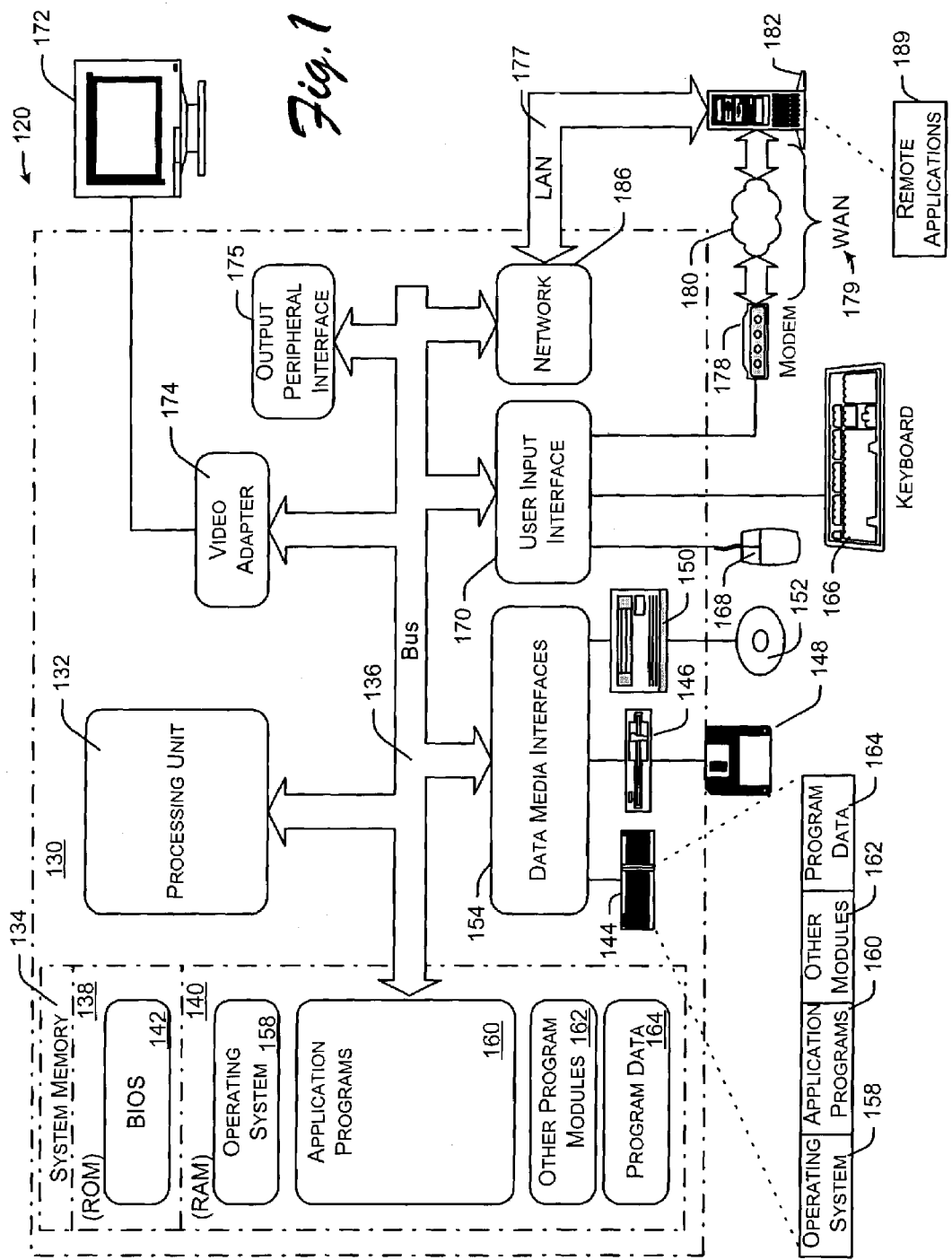
FIG. 1 is a block diagram of an exemplary computing environment within which systems and methods for query expansion may be implemented.

Turning to the drawings, wherein like reference numerals refer to like elements, the invention is illustrated as being implemented in a suitable computing environment. Although not required, the invention is described in the general context of computer-executable instructions, such as program modules, being executed by a personal computer.

Program modules generally include routines, programs, objects, components, data structures, etc., that perform particular tasks or implement particular abstract data types.

FIG. 1 illustrates an example of a suitable computing environment 120 on which the subsequently described systems, apparatuses and methods to expand queries may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
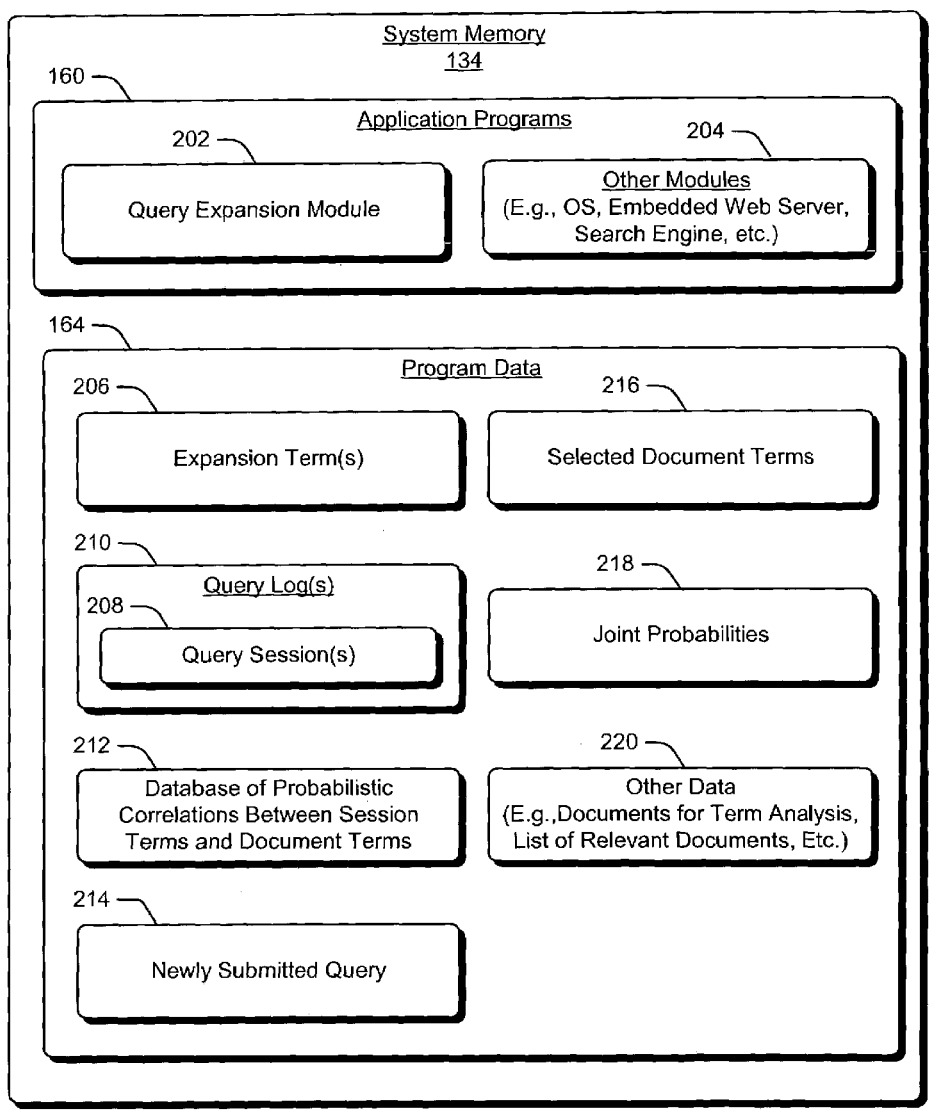
FIG. 2 is a block diagram that shows further exemplary aspects of application programs and program data of the exemplary computing device of FIG. 1.

FIG. 2 is a block diagram that shows further exemplary aspects of application programs 160 and program data 164 of FIG. 1 used to expand query terms. System memory 134 is shown to include a number of application programs including, for example, query expansion module 202 and other modules 204. Other modules includes, for example, an operating system to provide a run-time environment, a search engine to generate lists of documents from submitted queries, an embedded Web server to provide search engine services to Web users, and so on.

The query expansion module identifies one or more query expansion terms 206 from analysis of query session(s) 208 stored in query log(s) 210. A query session is represented, for example, as follows:

query session=<keyword term(s)>[document identifier(s)].

Each query session is associated with one or more keyword terms or "terms" from one (1) query and corresponding identifier(s) for the one or more documents that were selected by the user from a document list. Each document ID substantially uniquely identifies a particular document that was selected by the user from a document list. In one implementation, one or more of the documents IDs are Universal Resource Locators (URLs). The document list was returned to the user by a search engine (i.e., see the search engine 204 of "other modules") responsive to searching for information that includes keywords indicated by the term(s) of the query. Through daily use, the search engine accumulates a substantially large number of such query logs.

The query expansion module 202 generates a database of probabilistic correlations 212 between previous query terms and document terms. These probabilistic correlations are made between each pair of a previous query term and a document term, as a function of statistics of the whole query logs The document terms are terms in the documents selected by a system responsive to search engine queries. These documents are identified in the query log(s) 210. The probabilistic correlations indicate the conditional probability of the appearance of a document term when a query term is used. For instance, if a document that has been selected by a user more than once for a query consisting of the same terms, then the document is correlated to the terms in the query.

The probabilistic correlations are based on an assumption that each document that is returned to a user in response to a query and that is also selected or "clicked" by the user will be "relevant" to the particular query. Although such user selection information is not as accurate as an explicit relevance indication from a user, as often used in traditional information retrieval, each document returned in response to a query submission that is selected by a user does suggest implied relevance of that document to the user's information need. Even if some erroneous user document clicks/selections are made, users do not typically select documents presented in response to a search engine query at random.

When the query expansion module 202 receives a newly submitted query 214, each keyword term that is not a stop term, is extracted. Stop terms are those terms that appear frequently in documents and do not provide any ability to discriminate one document from another. Such terms include, for example, "the", "this" or "and". For every extracted term the query expansion module generates selected document terms 216. Selected document terms represent corresponding ones i.e. (one or more) of the terms (i.e., one or more of the terms) selected from the probabilistic correlation database 212. The query expansion module then determines the joint probability 206 for every selected document term as a function of at least the combined probabilities from all terms of a newly submitted query 214, corresponding ones of the session queries 208, and/or from all conditional probabilities of document term given query term. The joint probabilities are ranked.

The query expansion model selects one or more expansion terms 206 from the top-ranked selected document terms. A top-ranked expansion term is a term with a higher calculated joint probability than the joint probability corresponding to another term. The selected expansion terms are added to the terms of the newly submitted query. In this manner, high-quality expansion terms are added to the terms (i.e., expanding) of a newly submitted query before sending it to the search engine (see, the search engine of "other modules" 204).

In light of the above, the query log(s) 210 are a very valuable resource containing abundant implied relevance feedback data. Such implied feedback is used to overcome the problems that are often endemic in traditional relevance feedback techniques. Such problems include the lack of sufficient explicit relevance judgment information from a user, the mismatch problems of conventional global analysis techniques, or the problems associated with top-ranked documents that are not of informational interest to the user or even relevant to the submitted query.

Figure 3:
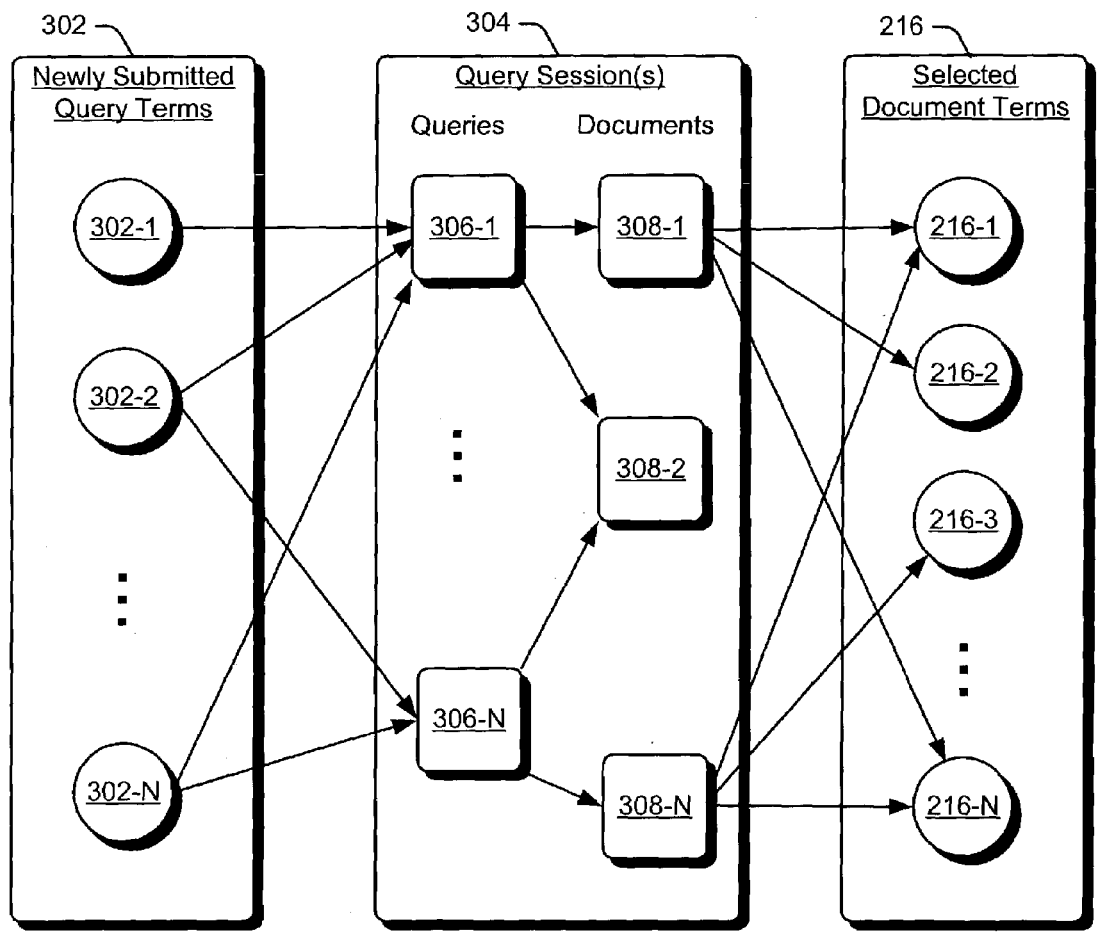
FIG. 3 shows that correlations between terms of newly submitted queries and document terms can be established via information maintained in query sessions from a query log.

FIG. 3 shows that correlations between terms of newly submitted queries and document terms can be established via information maintained in query sessions from a query log. Paths between respective terms 302 of a newly submitted query 214 (FIG. 2) and particular terms of from a selected document (identified via a query session 208 of FIG. 2) are represented in FIG. 3 via directional arrows. In particular, such paths map new query terms 302 via previous query session terms 306 and selected documents 308 to selected document terms 216. If there is at least one path between a newly submitted term and one document term, the query expansion module 202 establishes a probabilistic link between the two terms.

Figure 4:
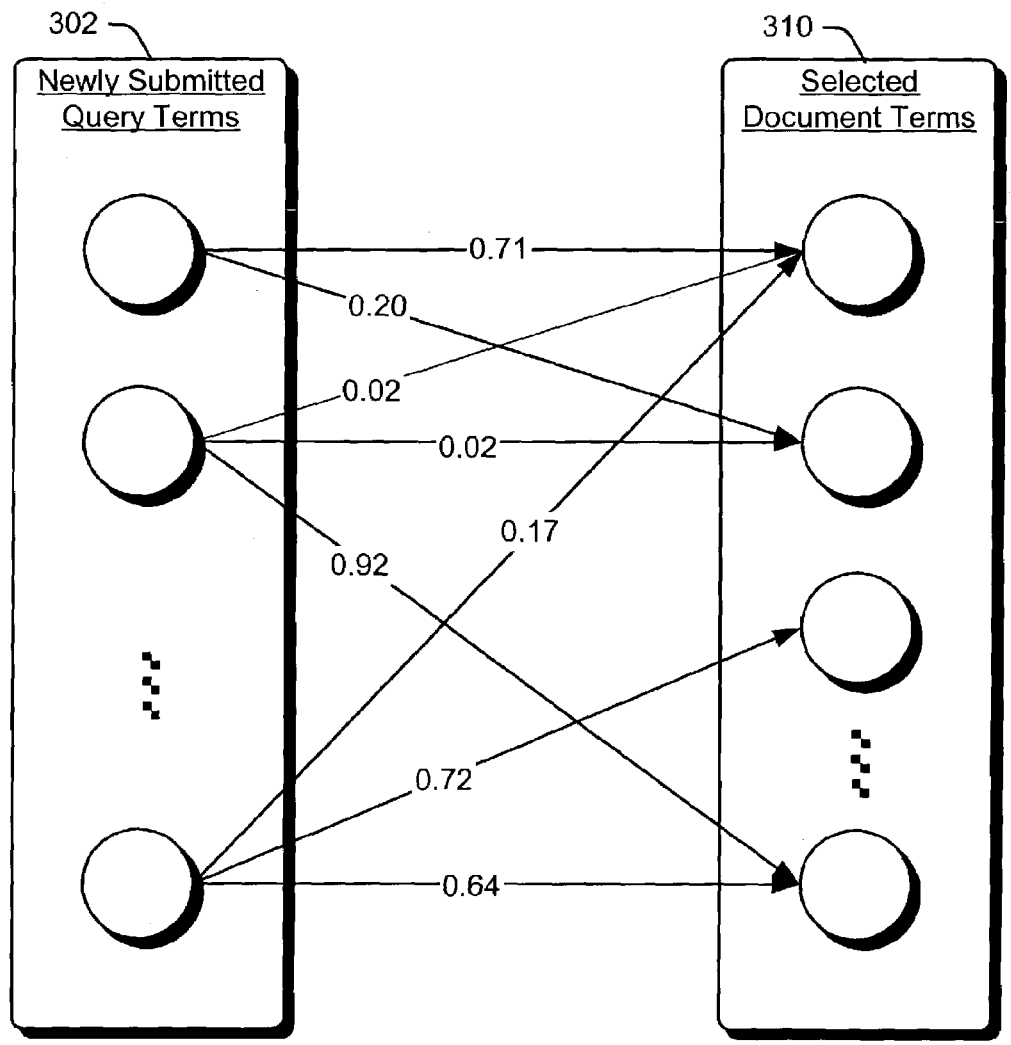
FIG. 4 shows exemplary probabilistic correlations between query terms and document terms.

FIG. 4 shows exemplary probabilistic correlations between query terms 302 (newly submitted or logged session terms) and document terms 310. The degree of correlation between a query term and a document term is the conditional probability of a document term's appearance on condition that the query term is used. The query expansion module calculates such degrees of correlation between respective ones of the terms 302 and 216 as follows. Let $w_j^{(d)}$ and $w_i^{(q)}$ be an arbitrary document term and query term respectively, wherein the query term for purposes of equations 4-7 are respective ones of the query terms recorded in the query log(s) 210 (FIG. 2). According to the Bayesian theorem, the conditional probability $P(w_j^{(d)}|w_i^{(q)})$ is defined as follows.

$$P(w_j^{(d)} | w_i^{(q)}) = \frac{P(w_j^{(d)}, w_i^{(q)})}{P(w_i^{(q)})} \quad (4)$$

$$= \frac{\sum_{\forall D_k \in S} P(w_j^{(d)}, w_i^{(q)} | D_k) \times P(D_k)}{P(w_i^{(q)})}$$

$$= \frac{\sum_{\forall D_k \in S} P(w_j^{(d)}, w_i^{(q)}, D_k)}{P(w_i^{(q)})}$$

-continued $$= \frac{\sum_{\forall D_k \in S} P(w_j^{(d)} \mid w_i^{(q)}, D_k) \times P(w_i^{(q)}, D_k)}{P(w_i^{(q)})}$$

$$= \frac{\sum_{\forall D_k \in S} P(w_j^{(d)} \mid D_k) \times P(D_k \mid w_i^{(q)}) \times P(w_i^{(q)})}{P(w_i^{(q)})}$$

$$= \sum_{\forall D_k \in S} P(w_j^{(d)} \mid D_k) \times P(D_k \mid w_i^{(q)}).$$

S is a set of documents. A document is added into the set if and only if its document identification (ID) and the query term $w_i^{(q)}$ co-occur in at least one query session (that is, there is at least one user using the query term $w_i^{(q)}$ has selected/clicked on the document).

$P(D_k|w_i^{(q)})$ is the conditional probability of the document $D_k$ being clicked in case that $w_i^{(q)}$ appears in the user query. $P(w_j^{(d)}|D_k)$ is the conditional probability of occurrence of $w_j^{(d)}$ if the document $D_k$ is selected. It is noted that $$P(w_j^{(d)} \mid w_i^{(q)}, D_k) = P(w_j^{(d)} \mid D_k).$$

This is because the document $D_k$ separates the query term $w_i^{(q)}$ from the document term $w_j^{(d)}$.

$P(D_k|w_i^{(q)})$ can be statistically obtained from the query logs. $P(w_j^{(d)}|D_k)$ depends on the frequency of occurrence of $w_j^{(d)}$ in the document $D_k$, as well as the occurrence of the term $w_j^{(d)}$ in the whole document collection. So the following formulas approximate $P(D_k|w_i^{(q)})$ and $P(w_j^d|D_k)$:

$$P(D_k \mid w_i^{(q)}) = \frac{f_{ik}^{(q)}(w_i^{(q)}, D_k)}{f^{(q)}(w_i^{(q)})} \quad (5)$$

$$P(w_j^{(d)} \mid D_k) = \frac{W_{jk}^{(d)}}{\max_{\forall t \in D_k}(W_{tk}^{(d)})} \quad (6)$$

Where $f_{ik}^{(q)}(w_i^{(q)}, D_k)$ is the number of the query sessions in which the query word $w_i^{(q)}$ and the document $D_k$ appear together. $f^{(q)}(w_i^{(q)})$ is the number of the query sessions that contain the term $w_i^{(q)}$. $W_{jk}^{(d)}$ is the normalized weight of the term $w_j^{(d)}$ in the document $D_k$, which is divided by the maximum value of term weights in the document $D_k$.

By combining the formulas (4), (5) and (6), the following formula is obtained to calculate $P(w_j^{(d)}|w_i^{(q)})$.

$$P(w_j^{(d)} \mid w_i^{(q)}) = \sum_{\forall D_k \in S} \left( W_{jk}^{(d)} \times \frac{f_{ik}^{(q)}(w_i^{(q)}, D_k)}{f^{(q)}(w_i^{(q)})} \right) \quad (7)$$

In one implementation, probabilistic correlations between query terms and document terms from the query logs 210 are pre-computed offline prior to evaluating terms of a newly submitted query 214 for expansion.

When a new query comes arrives, the terms in the query (with stop words being removed) are extracted. Then for every extracted term, all correlated document terms are selected based on the conditional probability in the formula (7). By combining the probabilities of all query terms, the joint probability for every document term is obtained according to the following:

$$P(w_j^{(d)} \mid Q) = \ln\left(\prod_i \left(P(w_j^{(d)} \mid w_i^{(q)}) + 1\right)\right). \quad (8)$$

Q stands for the terms extracted from the newly submitted query 214. Thus, for every query, we get a list of candidate expansion terms as well as the conditional probabilities between each term and the query. Then the top-ranked terms are selected as expansion terms, which are then add to the terms of the newly submitted query for submitting to the search engine.

An Exemplary Procedure

Figure 5:
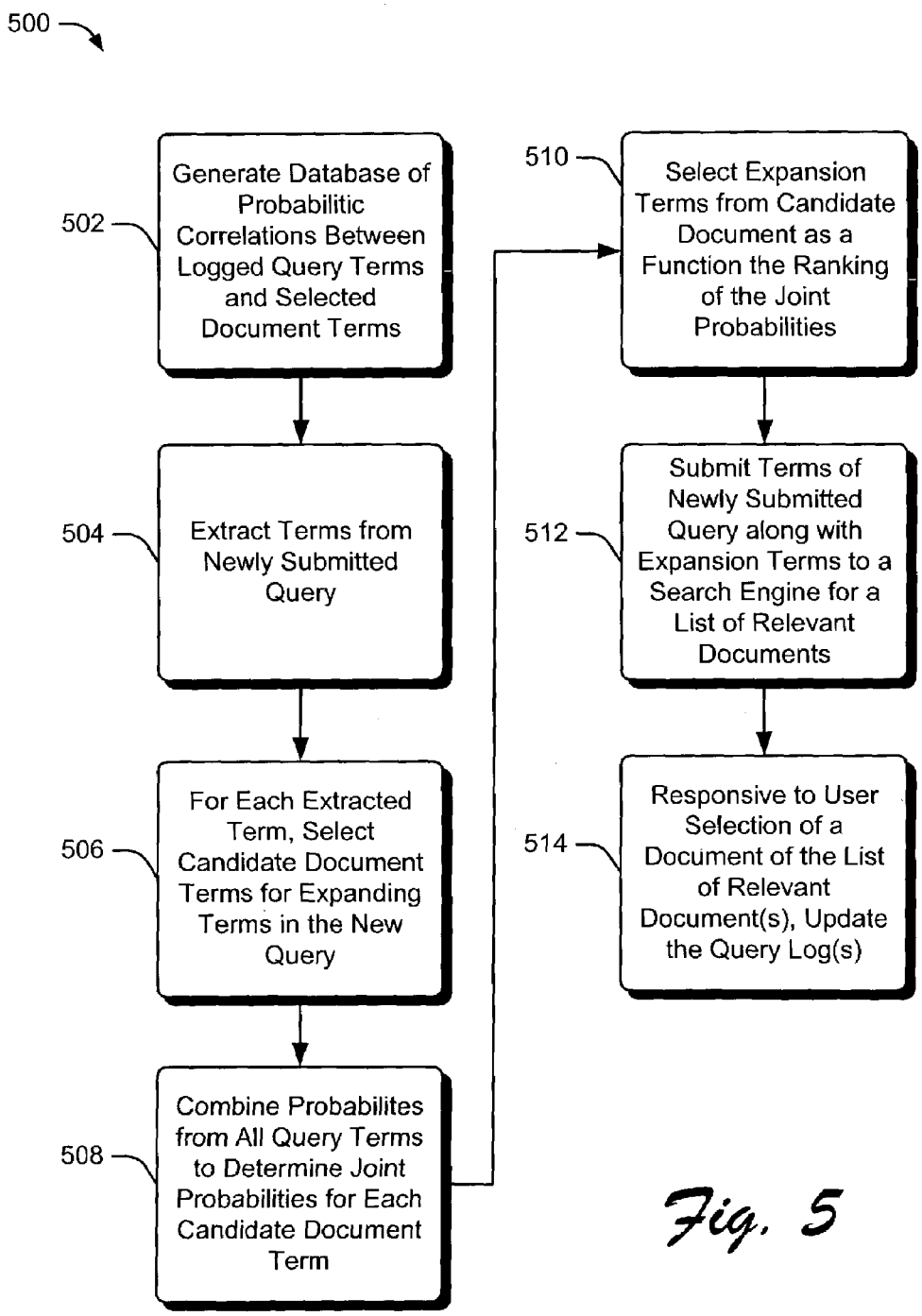
FIG. 5 shows an exemplary procedure for query expansion.

FIG. 5 shows an exemplary procedure 500 for query expansion. The operations of this procedure are described in reference to the program module and data components of FIGS. 1 and 2. At block 502, the query expansion module 202 (FIG. 2) analyzes one or more query logs 210 (FIG. 2) to generate a database of probabilistic correlations 214 (FIG. 2) between query terms and document terms from logged session(s) 208 (FIG. 2). These correlations represent the conditional probability of a document term's appearance on condition that term was used in a session query. At block 504, responsive to receiving a newly submitted query 214 from a client computing device (e.g., a remote device 182 of FIG. 1), the query expansion module extracts every term that is not a stop term from the newly submitted query.

At block 506, the query expansion module 202 (FIG. 2) selects one or more document terms from the probabilistic correlation database 212 (FIG. 2). Each selected document term 216 (FIG. 2) has at least one correlation with a particular one of the extracted query terms. At block 508, the query expansion module combines the probabilities from all terms of a newly submitted query 214 (FIG. 2) and session queries 208 (FIG. 2) to obtain the joint probability 206 (FIG. 2) for every selected document term 216 (FIG. 2). At block 510, the query expansion model compares the joint probabilities to select top-ranked expansion term(s) 206 for adding to the terms of the newly submitted query. A top-ranked expansion term is a term with a higher calculated joint probability than the joint probability corresponding to another term. In this manner, high-quality expansion terms are identified for adding to the terms of the newly submitted query.

At block 512, the query expansion module submits terms of the newly submitted query 214 (FIG. 2) and the expansion terms 206 (FIG. 2) to a search engine (see, other modules 204 of FIG. 2) for a list of relevant documents (see, the relevant documents portion of other data 220 of FIG. 2). The list of relevant documents is communicated to the client computing device (e.g., the remote device 182 of FIG. 1 that communicated the newly submitted query). At block 514, the query expansion module, responsive to an indication of user selection of a document from the list of relevant documents, generates a new or updates a previous query session 208 (FIG. 2) in a query log 210 (FIG. 2).

In one implementation, a Web browser application executing at a client computing device (e.g., the remote device 182 of FIG. 1) automatically communicates the identity of a document to the computing device 130 (FIG. 1) hosting the query expansion module 202 (FIG. 2), wherein the document was selected by the user from the relevant document list provided to the client device.

Conclusion

The described systems and methods expand queries. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A computer-based method for query expansion, the method comprising:
   extracting new terms from a newly submitted query;
   identifying expansion terms for adding to the new terms prior to submission to a search engine for retrieval of a relevant document list, the expansion terms being identified at least in part on the new terms and probabilistic correlations from information in a query log;
   wherein the information comprises one or more query terms and a corresponding set of document identifiers (IDs), the query terms having been submitted to a search engine, the document IDs represent each document selected from a list generated by the search engine responsive to searching for information relevant to corresponding ones of the query terms;
   presenting the relevant document list to a user; and
   wherein identifing expansion terms further comprises:
      selecting particular ones of the document terms that correspond to the new terms according to the following:

$$P(w_j^{(d)} \mid w_i^{(q)}) = \sum_{\forall D_k \in S} \left( W_{jk}^{(d)} \times \frac{f_{ik}^{(q)}(w_i^{(q)}, D_k)}{f^{(q)}(w_i^{(q)})} \right),$$

wherein $w_j^{(d)}$ and $w_i^{(q)}$ are an arbitrary document term and query term respectively, and $P(w_j^{(d)} \mid w_i^{(q)})$ is defined as follows:

$$P(w_j^{(d)} \mid w_i^{(q)}) = \frac{P(w_j^{(d)}, w_i^{(q)})}{P(w_i^{(q)})}$$

$$= \frac{\sum_{\forall D_k \in S} P(w_j^{(d)}, w_i^{(q)} \mid D_k) \times P(D_k)}{P(w_i^{(q)})}$$

$$= \frac{\sum_{\forall D_k \in S} P(w_j^{(d)}, w_i^{(q)}, D_k)}{P(w_i^{(q)})}$$

$$= \frac{\sum_{\forall D_k \in S} P(w_j^{(d)} \mid w_i^{(q)}, D_k) \times P(w_i^{(q)}, D_k)}{P(w_i^{(q)})}$$

$$= \frac{\sum_{\forall D_k \in S} P(w_j^{(d)} \mid D_k) \times P(D_k \mid w_i^{(q)}) \times P(w_i^{(q)})}{P(w_i^{(q)})}$$

$$= \sum_{\forall D_k \in S} P(w_j^{(d)} \mid D_k) \times P(D_k \mid w_i^{(q)}), \text{ and}$$

wherein S is a set of documents, $P(D_k \mid w_i^{(q)})$ is the conditional probability of the document $D_k$ being selected in case that $w_i^{(q)}$ appears in the user query, $P(w_j^{(d)} \mid D_k)$ is the conditional probability of occurrence of $w_j^{(d)}$ if the document $D_k$ is selected, $P(D_k \mid w_i^{(q)})$ is statistically obtained from the query log, $P(w_j^{(d)} \mid D_k)$ is a function of frequency of occurrence of $w_j^{(d)}$ in a document $D_k$, as well as the occurrence of the term $w_j^{(d)}$ in all documents identified in the user log.

2. The method of claim 1, wherein identifying expansion terms further comprises:
   calculating joint probabilities for each of the particular ones; and
   selecting expansion terms from the particular ones based on rankings of the joint probabilities, the expansion terms for adding to the new terms before submission to a search engine.

3. The method of claim 1, wherein $$P(D_k \mid w_i^{(q)}) = \frac{f_{ik}^{(q)}(w_i^{(q)}, D_k)}{f^{(q)}(w_i^{(q)})}, \; P(w_j^{(d)} \mid D_k) = \frac{W_{jk}^{(d)}}{\max_{\forall t \in D_k}(W_{tk}^{(d)})},$$

wherein $f_{ik}^{(q)}(w_i^{(q)}, D_k)$ is the number of query sessions in which $w_i^{(q)}$ and document $D_k$ appear together, $f^{(q)}(w_i^{(q)})$ is a number of query sessions that contain term $w_i^{(q)}$, $W^{jk(q)}$ is a normalized weight of the term $w_j^{(d)}$ in document $D_k$, which is divided by a maximum value of term weights in a document $D_k$.

4. The method of claim 1, wherein identifying expansion terms further comprises:
   calculating joint probabilities for each of the particular ones according to:

$$P(w_j^{(d)} \mid Q) = \ln\left(\prod_i \left(P(w_j^{(d)} \mid w_i^{(q)}) + 1\right)\right),$$

wherein Q stands for the new terms; and
selecting the expansion terms from the particular ones as a function of rankings of the joint probabilities.

5. The method of claim 1, and wherein the method further comprises generating a database of the probabilistic correlations.

6. A computer-readable medium for query expansion, the computer-readable medium having a tangible component comprising computer-program executable instructions executable by a processor for:
   generating a database of probabilistic correlations from information in a query log, the information comprising one or more query terms and a corresponding set of document identifiers (IDs), the query terms having been submitted to a search engine, the document IDs represent each document selected by a user from a list generated by the search engine in response to searching for information relevant to corresponding ones of the query terms;
   extracting new terms from a newly submitted query; and
   identifying expansion terms based at least in part on the new terms and the probabilistic correlations, the expansion terms for adding to the new terms prior to submission to the search engine for retrieval of a relevant document list;

presenting the relevant document list to a user; and
wherein the computer-program instructions for identifying expansion terms further comprise instructions for:
  selecting particular ones of the document terms that correspond to the new terms according to the following:

$$P(w_j^{(d)} \mid w_i^{(q)}) = \sum_{\forall D_k \in S} \left( W_{jk}^{(d)} \times \frac{f_{ik}^{(q)}(w_i^{(q)}, D_k)}{f^{(q)}(w_i^{(q)})} \right),$$

wherein $w_j^{(d)}$ and $w_i^{(q)}$ are an arbitrary document term and query term respectively, and $P(w_j^{(d)} \mid w_i^{(q)})$ is defined as follows:

$$P(w_j^{(d)} \mid w_i^{(q)}) = \frac{P(w_j^{(d)}, w_i^{(q)})}{P(w_i^{(q)})}$$

$$= \frac{\sum_{\forall D_k \in S} P(w_j^{(d)}, w_i^{(q)} \mid D_k) \times P(D_k)}{P(w_i^{(q)})}$$

$$= \frac{\sum_{\forall D_k \in S} P(w_j^{(d)}, w_i^{(q)}, D_k)}{P(w_i^{(q)})}$$

$$= \frac{\sum_{\forall D_k \in S} P(w_j^{(d)} \mid w_i^{(q)}, D_k) \times P(w_i^{(q)}, D_k)}{P(w_i^{(q)})}$$

$$= \frac{\sum_{\forall D_k \in S} P(w_j^{(d)} \mid D_k) \times P(D_k \mid w_i^{(q)}) \times P(w_i^{(q)})}{P(w_i^{(q)})}$$

$$= \sum_{\forall D_k \in S} P(w_j^{(d)} \mid D_k) \times P(D_k \mid w_i^{(q)}), \text{ and}$$

wherein S is a set of documents, $P(D_k \mid w_i^{(q)})$ is the conditional probability of the document $D_k$ being selected in case that $w_i^{(q)}$ appears in the user query, $P(w_j^{(d)} \mid D_k)$ is the conditional probability of occurrence of $w_j^{(d)}$ if the document $D_k$ is selected, $P(D_k \mid w_i^{(q)})$ is statistically obtained from the query log, $P(w_j^{(d)} \mid D_k)$ is a function of frequency of occurrence of $w_j^{(d)}$ in a document $D_k$, as well as the occurrence of the term $w_j^{(d)}$ in all documents identified in the user log.

7. The computer-readable medium of claim 6, wherein the computer-program instructions for identifying expansion terms further comprise instructions for:
  calculating joint probabilities for each of the particular ones; and
  selecting expansion terms from the particular ones based on rankings of the joint probabilities, the expansion terms for adding to the new terms before submission to a search engine.

8. The computer-readable medium of claim 6, wherein $$P(D_k \mid w_i^{(q)}) = \frac{f_{ik}^{(q)}(w_i^{(q)}, D_k)}{f^{(q)}(w_i^{(q)})}, \quad P(w_j^{(d)} \mid D_k) = \frac{W_{jk}^{(d)}}{\max_{\forall t \in D_k}(W_{tk}^{(d)})},$$

wherein $f_{ik}^{(q)}(w_i^{(q)}, D_k)$ is the number of query sessions in which $w_i^{(q)}$ and document $D_k$ appear together, $f^{(q)}(w_i^{(q)})$ is a number of query sessions that contain term $w_i^{(q)}$, $W_{jk}^{(d)}$ is a normalized weight of the term $w_j^{(d)}$ in document $D_k$, which is divided by a maximum value of term weights in a document $D_k$.

9. The computer-readable medium of claim 6, wherein the computer-program instructions for identifying expansion terms further comprise instructions for:
  calculating joint probabilities for each of the particular ones according to:

$$P(w_j^{(d)} \mid Q) = \ln\left( \prod_i (P(w_j^{(d)} \mid w_i^{(q)}) + 1) \right),$$

wherein Q stands for the new terms; and
  selecting the expansion terms from the particular ones as a function of rankings of the joint probabilities.

10. A computing device for query expansion, the computing device comprising:
  a processor; and
  a memory coupled to the processor, the memory comprising computer-program executable instructions executable by the processor for:
    generating a database of probabilistic correlations from information in a query log, the information comprising one or more query terms and a corresponding set of document identifiers (IDs), the query terms having been submitted to a search engine, the document IDs represent each document selected by a user from a list generated by the search engine in response to searching for information relevant to corresponding ones of the query terms;
    extracting new terms from a newly submitted query; and identifying expansion terms based at least in part on the new terms and the probabilistic correlations, the expansion terms for adding to the new terms prior to submission to the search engine for retrieval of a relevant document list;
  presenting the relevant document list to a user; and
  wherein the computer-program instructions for identifying expansion terms further comprise instructions for:
    selecting particular ones of the document terms that correspond to the new terms according to the following:

$$P(w_j^{(d)} \mid w_i^{(q)}) = \sum_{\forall D_k \in S} \left( W_{jk}^{(d)} \times \frac{f_{ik}^{(q)}(w_i^{(q)}, D_k)}{f^{(q)}(w_i^{(q)})} \right),$$

wherein $w_j^{(d)}$ and $w_i^{(q)}$ are an arbitrary document term and query term respectively, and $P(w_j^{(d)} \mid w_i^{(q)})$ is defined as follows:

$$P(w_j^{(d)} \mid w_i^{(q)}) = \frac{P(w_j^{(d)}, w_i^{(q)})}{P(w_i^{(q)})}$$

$$= \frac{\sum_{\forall D_k \in S} P(w_j^{(d)}, w_i^{(q)} \mid D_k) \times P(D_k)}{P(w_i^{(q)})}$$

-continued $$= \frac{\sum_{\forall D_k \in S} P(w_j^{(d)}, w_i^{(q)}, D_k)}{P(w_i^{(q)})}$$

$$= \frac{\sum_{\forall D_k \in S} P(w_j^{(d)} | w_i^{(q)}, D_k) \times P(w_i^{(q)}, D_k)}{P(w_i^{(q)})}$$

$$= \frac{\sum_{\forall D_k \in S} P(w_j^{(d)} | D_k) \times P(D_k | w_i^{(q)}) \times P(w_i^{(q)})}{P(w_i^{(q)})}$$

$$= \sum_{\forall D_k \in S} P(w_j^{(d)} | D_k) \times P(D_k | w_i^{(q)}), \text{ and}$$

wherein S is a set of documents, $P(D_k|w_i^{(q)})$ is the conditional probability of the document $D_k$ being selected in case that $w_i^{(q)}$ appears in the user query, $P(w_j^{(d)}|D_k)$ is the conditional probability of occurrence of $w_j^{(d)}$ if the document $D_k$ is selected, $P(D_k|w_i^{(q)})$ is statistically obtained from the query log, $P(w_j^{(d)}|D_k)$ is a function of frequency of occurrence of $w_j^{(d)}$ in a document $D_k$, as well as the occurrence of the term $w_j^{(d)}$ in all documents identified in the user log.

11. A computing device as recited in claim 10, wherein the computer-program instructions for identifying expansion terms further comprise instructions for:

calculating joint probabilities for each of the particular ones; and selecting expansion terms from the particular ones based on rankings of the joint probabilities, the expansion terms for adding to the new terms before submission to a search engine.

12. A computing device as recited in claim 10, wherein $$P(D_k | w_i^{(q)}) = \frac{f_{ik}^{(q)}(w_i^{(q)}, D_k)}{f^{(q)}(w_i^{(q)})}, \; P(w_j^{(d)} | D_k) = \frac{W_{jk}^{(d)}}{\max_{\forall t \in D_k}(W_{tk}^{(d)})},$$

wherein $f_{ik}^{(q)}(w_i^{(q)}, D_k)$ is the number of query sessions in which $w_i^{(q)}$ and document $D_k$ appear together, $f^{(q)}(w_i^{(q)})$ is a number of query sessions that contain term $w_i^{(q)}$, $W_{jk}^{(d)}$ is a normalized weight of the term $w_j^{(d)}$ in document $D_k$, which is divided by a maximum value of term weights in a document $D_k$.

13. A computing device as recited in claim 10, wherein the computer-program instructions for identifying expansion terms further comprise instructions for:

calculating joint probabilities for each of the particular ones according to:

$$P(w_j^{(d)} | Q) = \ln\left(\prod_i (P(w_j^{(d)} | w_i^{(q)}) + 1)\right),$$

wherein Q stands for the new terms; and selecting the expansion terms from the particular ones as a function of rankings of the joint probabilities.

\* \* \* \* \*